United States Patent [19]

Marshall

[11] 4,251,061
[45] Feb. 17, 1981

[54] SNAP ROLLER

[76] Inventor: Edward Marshall, 4 Rosny St., Garden City 3207, Victoria, Australia

[21] Appl. No.: 940,752

[22] Filed: Sep. 8, 1978

Related U.S. Application Data

[63] Continuation-in-part of Ser. No. 840,751, Oct. 11, 1977, abandoned.

[51] Int. Cl.³ ............................................. B66D 1/36
[52] U.S. Cl. ..................................... 254/390; 24/237; 254/409
[58] Field of Search ................... 254/190 A, 192, 194, 254/195, 196; 24/237, 230.5 AD, 115 R

[56] References Cited

U.S. PATENT DOCUMENTS

| 675,306 | 5/1901 | St. John | 254/194 |
|---|---|---|---|
| 1,892,678 | 1/1933 | McIntyre et al. | 24/237 |
| 2,303,993 | 12/1942 | Gore | 24/237 |
| 3,975,921 | 8/1976 | Pomaski | 24/237 |

Primary Examiner—Robert J. Spar
Assistant Examiner—Kenneth Noland
Attorney, Agent, or Firm—Robert D. Farkas

[57] ABSTRACT

A snap roller utilized as a snatch lock employs a pulley and a rod fabricated from a wire-like spring material to which the pulley is journalled. The rod has a portion of its length, located substantially in the central regions thereof to which the pulley is journalled. A pair of portions of the length of the wire-like rod extends radially outwardly from the longitudinal axis of the pulley in a direction substantially parallel to one another. The ends of the wire-like rod are formed into oppositely directed hooks such that each of the distal ends approach, and if desired contact the opposed length of the pair of portions of the wire-like rod. In use, a rope or line may be passed between the hook-like ends so so as to engage a groove in the pulley due to the fact that each hook-like end resides in planes that are skew to one another allowing the distal ends of the hooks to be forced outwardly from the opposed one of the pair of portions of the wire-like rod. An alternate embodiment utilizes a hook-like excursion of the hook-like ends of the wire-like rod which engage portions of the lengths of the wire-like rod in a locking-like arrangement, which enhance the ability of the rod to carry great forces applied to the line or the eye hook carried thereby.

7 Claims, 3 Drawing Figures

SNAP ROLLER

This application is a continuation-in-part of prior U.S. Application Ser. No. 840,751, filed Oct. 11, 1977 now abandoned.

BACKGROUND OF THE INVENTION

1. THE FIELD OF THE INVENTION

This invention relates to snatch blocks and more particularly to that class fabricated from only two elements adapted to engage endless lines and bight-like fasteners.

2. DESCRIPTION OF THE PRIOR ART

The prior art abounds with hanks or snatch blocks. U.S. Pat. No. 90,113 issued May 18, 1869 to W. McKay et al teaches a pulley having one end thereof journalled to a scissor-like clamp and the other end thereof journable to another member of the scissor-like clamp when the scissor-like clamp is closed by pivoting about a pivot hinge located between the free ends of a pair of clamp elements. The other ends of a pair of clamp elements, when the scissor-like apparatus is closed, forms an opening useful to secure a bite-like element. This apparatus can engage an endless line which is adapted to wrap around the pulley and the bite when the scissor-like elements are opened. The disadvantage of this apparatus resides in the having to lock together the scissor-like elements by tightening a bolt passing through a pulley to which the pulley is journalled.

U.S. Pat. No. 218,691 issued on Aug. 19, 1879 to C. Spencer teaches a snatch-lock comprising a pair of plates each of which carries a pulley axle such that the plates are rotatable relative to one another. One end of each of the plates carry a semi-circular portion which forms a complete loop upon the plates being rotated relative to one another into a lock position. The other ends of the plates carry similar semi-circular portions which form an additional loop. An endless line may be carried by the groove in the pulley as well as a bight captured within the loop formed by the semi-circular portions of the device when closed into loop form. Means are provided for locking together the pair of plates into a position when the semi-circular plates define the hoop. The teachings of Spencer require three physical elements besides the axle to which the pulley is journalled and require a locking device to maintain the apparatus in a closed condition.

Both McKay et al and Spencer suffer the common deficiency of requiring costly components which must be accurately machined or fabricated, which easily wear out due to the requirement of having multiple mating surfaces that are required to be aligned in tight fits such that captured bight-like elements and endless lines do not easily become displaced from their captured positions.

SUMMARY OF THE INVENTION

A primary object of the present invention is to provide a snatch-block apparatus which may easily and quickly be utilized to engage an endless line or portions of an elongated line without requiring throwing of the line in engagement with the pulley portions thereof.

Another object of the present invention is to provide the snatch-block apparatus, which can be simultaneously utilized to engage a closed loop-like bight device without threading onto the bight portions thereof.

Still another object of the present invention is to provide a snatch-block which can be utilized to simultaneously engage an endless or long line without threading and a closed loop bight-like device, each independently located within the apparatus such that the line may be engaged onto the pulley and the bight-like device may grasp the snatch-block securely.

Yet another object of the present invention is to provide an apparatus utilized as a snatch-block which only requires a pair of components therefor.

A further object of the present invention is to provide a snatch-block which is extremely economical in cost and easily fabricated.

A still further object of the present invention is to provide a snatch-block wherein the pulley portion is fabricated from a plastic material such that the pulley easily journals to the remaining metallic portions of the apparatus.

Yet another object of the present invention is to provide a snatch block apparatus which lockingly engages the closed loop-like bight device, without threading, such that the bight device may carry substantial forces without forcing open the portion of the apparatus that engages the loop-like bight.

Heretofore, snatch-block devices were expensive to fabricate and difficult to maintain because the accurace required to construct such devices were necessarily high, and in use, such devices were unable to take abuse due to the fact that closed loops were formed in the construction thereof, when the apparatus was closed so as to successfully capture a bight-like engaging element and portions of a line within the pulley groove utilized. The prior art has utilized pulley axles cantilevered outwardly from a frame, such that the frame had at one end thereof, a hook-like end. This class of apparatus mounted the axle rod in cantilevered fashion so that when the line engaging the pulley exerted substantial forces on the frame, bending forces were created in the axle rod at the location where the axle rod joined the frame. This was also true for the cantilevered single hook-like end. The present invention faces these disadvantages by utilizing a pair of hook-like ends secured to the ends of an axle passing through the pulley. Utilizing this construction, the present invention eliminates the cantilevered related problem and the tendency for a single hook-like end to open and thus disengage a bight-like end of a mating element.

DESCRIPTION OF THE PREFERRED EMBODIMENT

The structure and method of fabrication of the present invention is applicable to a wire-like rod fabricated from a metallic material, preferably of corrosion resistant steel, protected by plating, to a portion of which a plastic pulley is journalled. The pulley is journalled to a middle portion of the wire-like rod. A pair of portions of the wire-like rod, each extend radially outwardly from the central pulley carrying portion, and each have longitudinal axes extending substantially parallel to the other and at right angles to the hole within the pulley. Hook-like ends are fabricated adjacent the ends of the wire-like rod such that the hooks turn in opposite directions having the distal endmost portions thereof almost coming into contact with the pair of portions of the length of the wire-like rod. The remaining portions of the hook-like ends reside in skew planes such that the planes intersect at a line extending parallel and spaced apart from the longitudinal axis of the pulley. The width of the pulley is designed to substantially reside between the pair of portions of the length of the wire-like rods such that portions of the pulley reside in a loop formed by the pair of hooks and the length of the pair of portions of the length of the wire-like element. This loop may be utilized to retain portions of an endless line or portions of the length of an extended line, when the line is wrapped partially about a groove in the pulley, and a bight-like end of a closed loop in an external device used to engage the present invention such that tension forces may be exerted on the line and the external apparatus, such that these tension forces are oppositely directed.

In an alternate embodiment, the hook-like ends are each having hook-like excursions immediately adjacent the free ends of the wire-like rod, such that the excursions may engage it's portions of the rod that have their longitudinal axis extend substantially parallel to each other and at right angles to the hole within the pulley. Each of such hook-like excursions extend in opposite directions, partially transverse to the opening formed by the hook-like ends. Thus, when a force is applied to the rod, away from the pulley, and on the parallel overlapping portions of the hook-like ends distant most from the pulley, the hook-like excursions lock onto the substantially parallel portions of the wire-like rod, providing a greater strength to the apparatus, permitting same to carry substantial forces on the pulley and the rod, each in opposite directions.

Figure 1:
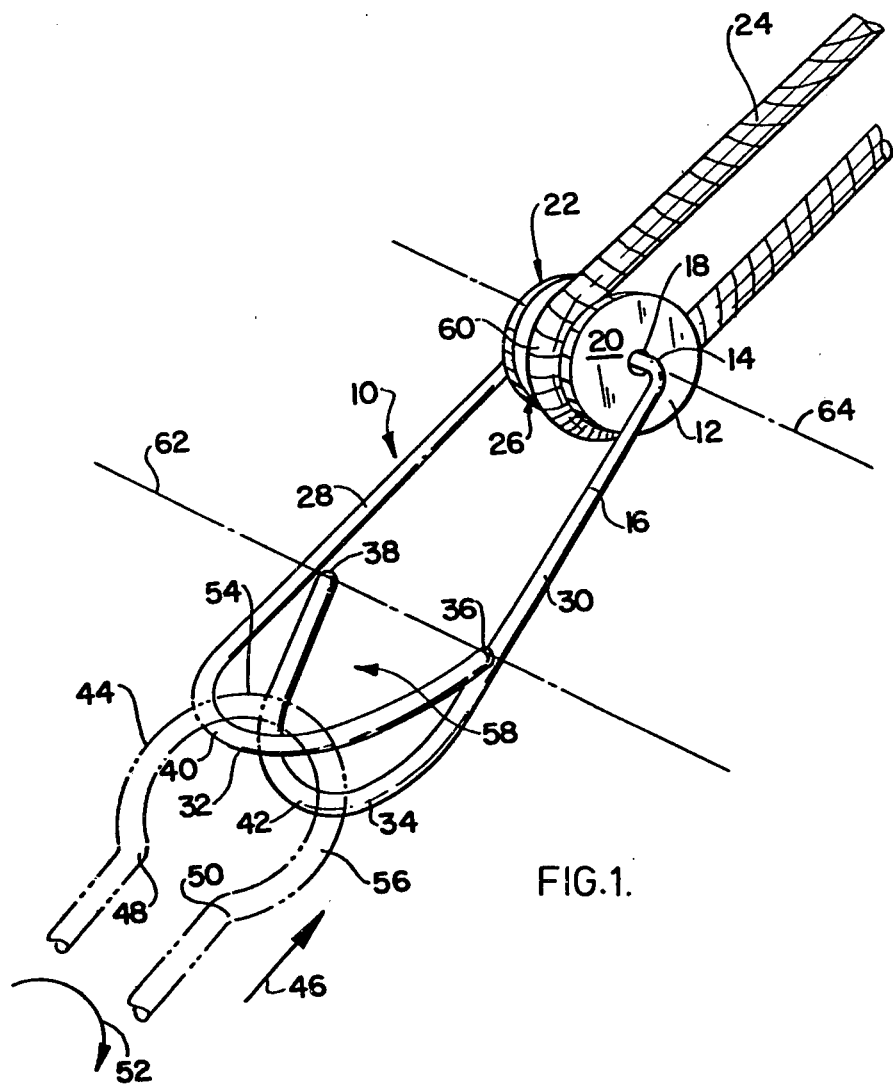
FIG. 1 is a perspective view of the present invention shown engaging a portion of an endless line and a bight-like end of an external apparatus.

Now referring to FIG. 1 showing the present invention 10 having pulley 12 journalled to a portion 14 of wire-like rod 16. Portion 14 is shown passing through opening 18 coaxially aligned between exterior planar surfaces 20 and 22 of pulley 12. An endless line 24 is shown engaged within groove 26 of pulley 12. A pair of portions 28 and 30 of wire-like rod 16 are shown fastened to portion 14 such that the longitudinal axes thereof extend substantially parallel to one another. Hook-like ends 32 and 34 are formed adjacent to portions 28 and 30 respectively. Free ends 36 and 38 of hooks 32 and 34 respectively are shown in touching engagement with portions 30 and 28 respectively. If desired, ends 36 and 38 may be spaced apart from portions 30 and 28 a distance less than points 40 and 42 in hooks 32 and 34 respectively. Loop 44 is shown engaging hooks 32 and 34. Loop 44 may be fabricated having a closed opening rather than the bight-like opening as shown, if desired. Loop 44 may be disengaged with hooks 32 and 34 by first causing loop 44 to be moved in the direction of arrow 46 to a location where point 48 and 50 are advanced beyond ends 36 and 38. A twisting motion exerted on loop 44 in the direction of arrow 52 permits point 54 to be located adjacent portion 36. In likewise fashion, point 56 is disposed adjacent end 38. A manual force exerted on loop 44 in the direction opposite to arrow 46, causes point 54 to slide between end 36 and portion 30, and in similar fashion, causes point 56 to slide between end 38 and portion 28 such that loop 44 may be totally disengaged from hooks 32 and 34. In similar fashion, loop 44, when disengaged from wire-like rod 16 may be installed within loop-like opening 58 by manually displacing loop 44 in the direction of arrow 46 when the plane defining loop 44 is disposed intermediate the planes defining hooks 32 and 34. When points 54 and 56 extend beyond ends 36 and 38, and closer to pulley 12, a twisting motion opposite to direction of arrow 52 causes loop 44 to be captured within loop-like opening 58. In similar fashion, the bight 60 formed by line 24, may be caused to be inserted into loop-like opening 58 so that line 24 may engage groove 26 of pulley 12, as shown. Alternately, line 24 may be disengaged from loop-like opening 58 by passing portions of the line between end 38 and portion 28 and end 36 and portion 30.

End 38 and 36 define a line depicted by dotted line 62, such that dotted line 62 extends parallel to but spaced apart from the longitudinal axis of pulley 12, depicted by dotted line 64. Dotted line 62 also defines the planes in which hooks 32 and 34 reside.

Figure 2:
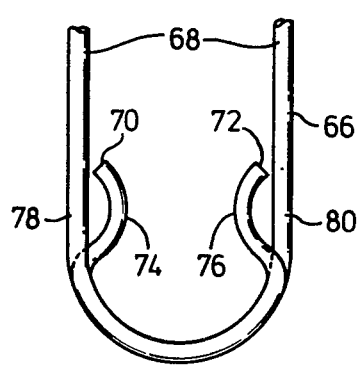
FIG. 2 is a plan view of an alternate embodiment of a portion of the apparatus shown in FIG. 1.

FIG. 2 illustrates an alternate embodiment 66, of wire-like rod 16, shown in FIG. 1. It should be understood that ends 68, are connected together, in the same manner as shown in FIG. 1, shown passing through pulley 12 thereof. Ends 70 and 72 are shown adjacent hook-like excursions 74 and 76 respectively and each of the hook-like excursions has a curved portion. Hook-like excursion 74 and end 70 both are capable of passing over surface 78 of wire-like rod 66. In opposite fashion, excursion 76 and end 72 are capable of engaging behind surface 80, of rod 66. The shape of rod 66, shown in FIG. 2, is the shape assumed thereby when rod-like element 66 is not subjected to any external forces of any kind.

Figure 3:
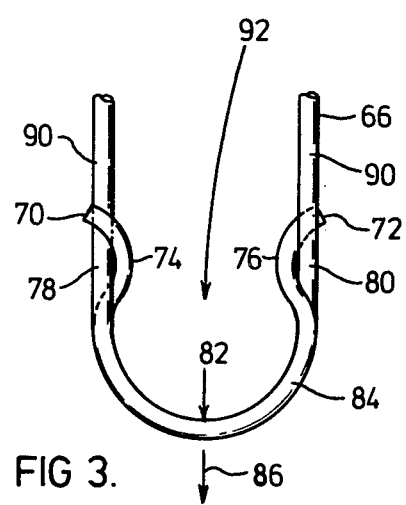
FIG. 3 is a plan view of the apparatus shown in FIG. 2, when in a locked position.

FIG. 3 illustrates the apparatus shown in FIG. 2, when a force, applied at point 82, of hook-like end 84, and the hook-like end therebehind, is applied in the direction of arrow 86. In such position, excursion 74 and 76 are shown engaging sides 90 of wire-like rod 66 such that end 70 is superimposed over surface 78 whilst end 72 is positioned behind surface 80 locking the hook-like excursions to sides 90. The springy-like characteristics of rod-like element 66 permit such element to reassume the shape shown in FIG. 2 when the applied force, at point 82, is removed. When such force is applied, the shape of rod-like element 66 is closed, forming a closed opening 92.

One of the advantages of the present invention is a snatch-block apparatus which may easily and quickly be utilized to engage an endless line or portions of an elongated line without requiring throwing of the line in engagement with the pulley portions thereof.

Another advantage of the present invention is the snatch-block apparatus, which can be simultaneously utilized to engage a closed loop-like bight device without threading onto the bight portions thereof.

Still another advantage of the present invention is a snatch-block which can be utilized to simultaneously engage and endless or long line without threading and a closed loop bight-like device, each independently located within the apparatus such that the line may be engaged onto the pulley and the bight-like device may grasp the snatch-block securely.

Yet another advantage of the present invention is an apparatus utilized as a snatch-block which only requires a pair of components therefor.

A further advantage of the present invention is a snatch-block which is extremely economical in cost and easily fabricated.

A still further advantage of the present invention is a snatch-block wherein the pulley portion is fabricated from a plastic material such that the pulley easily journals to the remaining metallic portions of the apparatus.

The present invention also provides a snatch block apparatus which lockingly engages the closed loop-like bight device, without threading, such that the bight device may carry substantial forces without forcing open the portion of the apparatus that engages the loop-like bight.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A snatch-block apparatus comprising a pulley, a wire-like rod, a central portion of said wire-like rod passing through an opening in said pulley such that said pulley is journalled thereto, a pair of portions of said wire-like rod located at one end adjacent said central portion of said wire-like rod and extending radially outwardly from said central portion of said wire-like rod, said pair of portions of said wire-like rod having the longitudinal axes thereof directed substantially parallel to one another, said wire-like rod having a pair of hook-like excursions, each of said hook-like excursions disposed adjacent the other end of said pair of portions, each of said hook-like excursions also having a curved portion, each of said curved portions being disposed immediately adjacent the free ends of said wire-like rod, whereby each of said curved portions of said hook-like excursions engage an opposite one of said pair of portions of said wire-like rod at points intermediate said opening and the distant most parts of said pair of hook-like excursions from said pulley in response to opposed forces being applied to said pulley and to said distant most parts of said pair of hook-like excursions, said hook-like excursions extend between said pair of portions in a curved course, each of said curved courses being disposed in a curved-like shape which is oppositely directed from said curved portions, said curved courses being substantially parallel to one another, each of said curved portions of said hook-like excursions having its free end thereof disposed on opposite sides of the plane defined by said longitudinal axes, each said distant most parts of said hook-like excursions residing on a side of said plane which is opposite to the side of said plane wherein the free end of its contiguous curved portion resides.

2. The apparatus as claimed in claim 1 wherein said wire-like rod comprises a plated steel material.

3. The apparatus as claimed in claim 1 wherein said pulley comprises a plastic material.

4. The apparatus as claimed in claim 1 wherein said pulley has a thickness substantially equal to the length of said central portion of said wire-like rod.

5. The apparatus as claimed in claim 1 wherein said wire-like rod is fabricated from a material possessing spring-like characteristics.

6. The apparatus as claimed in claim 1 wherein said pair of hook-like excursions have a curvature defining a radius substantially equal to one half the length of said pair of portions of said wire-like rod.

7. The apparatus as claimed in claim 1 wherein the total length of said wire-like rod equals the sum of the length of each of said pair of portions of the length of said wire-like rod and the length of said central portion of the length of said wire-like rod and the circumferential length of each of said hook-like excursions.

* * * * *